Patented Sept. 12, 1933

1,926,853

UNITED STATES PATENT OFFICE 1,926,853

SOLDER

Conral C. Callis and Ralph B. Derr, Oakmont, Pa., assignors to Aluminum Company of America, Pittsburgh, Pa., a corporation of Pennsylvania No Drawing. Application July 30, 1932
Serial No. 627,143

4 Claims. (Cl. 75—1)

This invention relates to a composition of matter for use as a solder for aluminum and its alloys, and particularly to a soldering composition having certain desirable characteristics for this purpose and hereinafter enumerated.

We have found a solder composition of about from 66 to 69 per cent by weight of tin, 28 per cent by weight of zinc, and 2.5 to 6.5 per cent by weight of aluminum to be particularly advantageous for this purpose and the following specific compositions to give the best results:

Percentage by weight

| Composition | Tin | Zinc | Aluminum | Freezing point (°F) |
|---|---|---|---|---|
| I | 69.0 | 28.5 | 2.5 | 505 |
| II | 66.5 | 28.5 | 5.0 | 538 |
| III | 66.0 | 27.5 | 6.5 | 552 |

It is to be noted that these mixtures have a freezing point of about 530 degrees Fahrenheit and that an increase in the aluminum content raises the freezing point. As the aluminum is increased, the strength of the solder is increased at the expense of the ease of application. However, if the proportions of the constituents remain within the limits given, the solder can be readily applied by any of the well known processes, such as dipping, pouring, or application with a heated iron. While the solders can be applied without the use of a flux, a flux is preferable, particularly if the metal to be soldered is dirty or if the oxide film normally present on the surface of the aluminum has not been removed by chemical or mechanical action. A flux is generally used when the solder is to be applied by dipping or pouring. Fluxes of suitable composition for use with this solder are disclosed in our copending applications, Serial No. 639,841 and Serial No. 639,842, filed October 27, 1932, and Serial No. 649,325, filed December 29, 1932.

Such a flux may consist, for example, of about 5 per cent stannous bromide, 40 per cent cadmium chloride, 20 per cent cadmium iodide, 25 per cent ammonium chloride, 2 per cent ammonium fluoride, and 8 per cent zinc chloride, by weight, to which is added a vehicle. This vehicle consists of a mixture of chlorinated diphenyl and chlorinated naphthalene melted together and to which is added up to about 15 per cent by weight of para-dichlor-benzene or cyclo-hexanol to secure any desired degree of fluidity. The salt flux and the vehicle are finally mixed together in the approximate proportions of about 4 parts of the salts to 6 parts of the vehicle.

These solders are prepared by melting and mixing the various constituents and are either used in the molten form or are cast into strips, rods or ribbons for application with an iron. We have found that best results are usually, but not necessarily, obtained when commercially pure metal is used, as small amounts of impurities may result in drossing with resulting porosity of the joint formed of the solder. The solders, when prepared of the pure metals, are substantially more corrosion-resistant and ductile.

We claim:
1. A solder for aluminum and its alloys consisting of about 66 to 69 per cent by weight of tin, about 27.5 to 28.5 per cent by weight of zinc, and about 2.5 to 6.5 per cent by weight of aluminum.
2. A solder for aluminum and its alloys consisting of about 69 per cent by weight of tin, about 28.5 per cent by weight of zinc, and about 2.5 per cent by weight of aluminum.
3. A solder for aluminum and its alloys consisting of about 66.5 per cent by weight of tin, about 28.5 per cent by weight of zinc, and about 5.0 per cent by weight of aluminum.
4. A solder for aluminum and its alloys consisting of about 66 per cent by weight of tin, about 27.5 per cent by weight of zinc, and about 6.5 per cent by weight of aluminum.

CONRAL C. CALLIS.
RALPH B. DERR.